May 1, 1951      G. A. CUSHMAN      2,550,976
REPLACEABLE BEET ELEVATING SPIKE FOR BEET HARVESTERS
Filed June 9, 1945
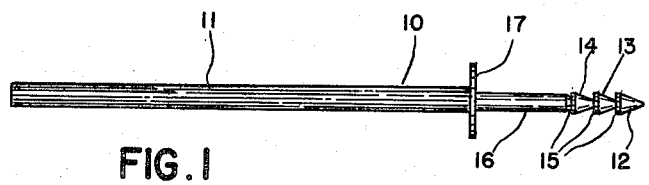
FIG. 1
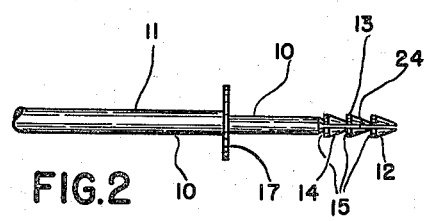
FIG. 2
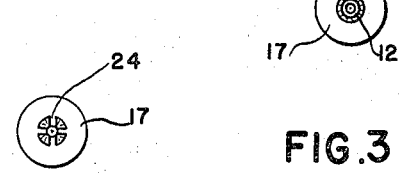
FIG. 3
FIG. 4
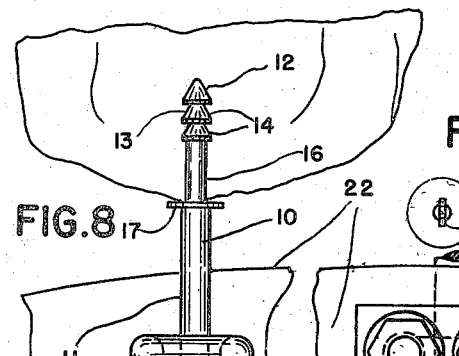
FIG. 8
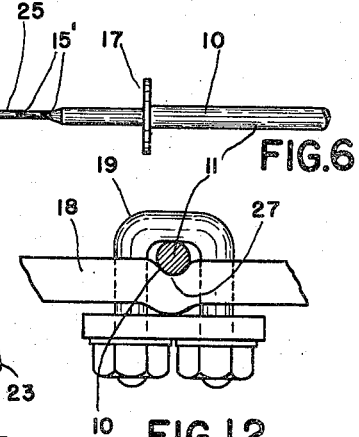
FIG. 5
FIG. 6
FIG. 12
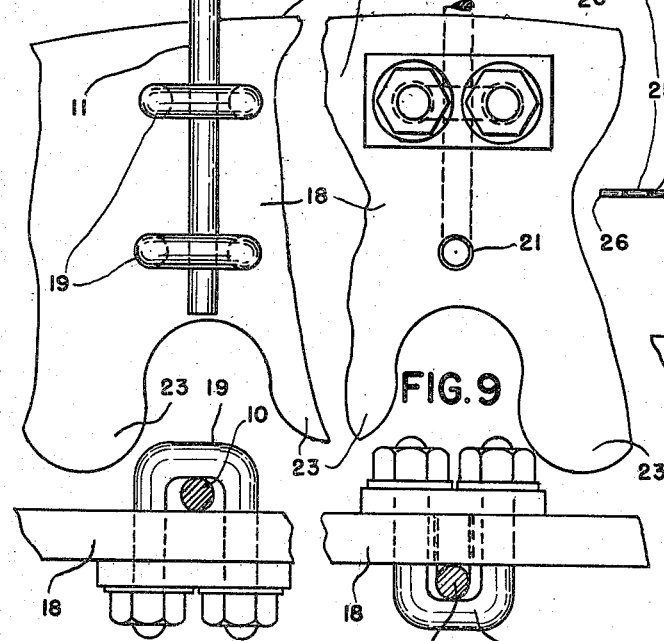
FIG. 7
FIG. 9
FIG. 10
FIG. 11
INVENTOR
GEORGE A. CUSHMAN
BY 
ATTORNEY Patented May 1, 1951

2,550,976

UNITED STATES PATENT OFFICE 2,550,976

REPLACEABLE BEET ELEVATING SPIKE FOR BEET HARVESTERS

George A. Cushman, Minneapolis, Minn., assignor of one-half to Harry R. Olson, Minneapolis, Minn.

Application June 9, 1945, Serial No. 598,597

2 Claims. (Cl. 55—108)

This invention relates to a replaceable spike for beet harvesters or similar machines which are adapted to pick up sugar beets or other vegetables which are harvested from the ground and where it is desirable to elevate the beet or the body of the vegetable and to sever the top and the foliage from the body of the beet.

A feature resides in providing a replaceable spike which is adapted to be secured to the rim of the harvester wheel so that a new spike may be secured to the rim when the old spike is worn out. Furthermore it is a feature to provide an adjustable spike which may be adjusted to project from the rim of the pickup wheel to a predetermined distance. This permits a long or short portion of the spike to project from the wheel which supports the spike.

A primary feature of this pickup spike resides in the formation of the end which is adapted to be forced into the crown of the beet as the wheel carrying the spikes rotates over the ground. The wheel carrying the spike may be in any suitable form and as illustrated is a narrow plate-like annular wheel formed with internal teeth for supporting and rotating the wheel in the operation of the beet harvester.

The pickup spikes are spaced apart about the entire rim of the wheel and project therefrom so as to penetrate into the crown of the beet as the spikes rotate over the ground. A primary feature of this pickup spike resides in the formation of the end which is designed to penetrate easily into the beet but is formed with a series of annular shoulders so as to prevent the beet from slipping off the spike once it is picked up by the same so that one or more spikes may penetrate into the crown of the beet, depending on the size of the beet, and thus the beet will be supported projecting from the rim of the wheel which carries the beet around to a position where the crown may be severed from the body of the beet. The crown of the beet carries the foliage which projects above the head of the beet and is severed with the crown to separate the same from the body of the beet. It is important that the spike firmly support the beet to carry it up into topping position and by means of the shoulders on the spikes the beet is held firmly in place. When the crown of the beet is severed with the foliage from the body of the beet, the pickup wheel carries the same around to a position where the crown with the foliage of the beet is forced off the spikes.

It is important that the shoulders be formed on the outer end of the spike so as to hold the beet from dropping off the spike as the beet is elevated between the wheels. A base shoulder formed annularly about the spike below the shoulders formed on the outer end of the spikes prevents the spikes from penetrating too deep into the body of the beet as it is picked up by the spike. The pickup end of the spike is of primary importance and may be formed round or flat with longitudinal grooves extending through the adjacent positioned conical ends formed on the outer ends of the spike.

It is also a feature to provide a pickup wheel in combination with the pickup spikes wherein the surface of the wheel may be formed with a radial groove in which the shank of the spike may be supported to hold the spike in upright position and then by means of a suitable clamp the shank of the spike may be secured to the wheel and held adjustable so as to extend or project from the outer rim of the wheel. It is also a feature to stagger the spikes, placing one on one side and the next on the opposite side of the pickup wheel.

These features together with other details and objects of the invention will be more fully hereinafter set forth.

In the drawings forming a part of the specification:

Figure 1 illustrates one of the spikes.

Figure 2 illustrates a similar view of the spike showing longitudinal grooves formed in the conical shoulders.

Figure 3 is an end view of Figure 1 looking toward the point and the conical shoulders.

Figure 4 is an end view of Figure 2 showing the longitudinal grooves.

Figure 5 is a detail of the flattened end of an alternative form of the spike.

Figure 6 is a view of the spike shown in Figure 5 looking toward the edge of the flat outer end of the spike.

Figure 7 is an end view of Figure 5 looking toward the point of the spike.

Figure 8 illustrates a portion of the pickup wheel of the beet harvester showing the spike secured by a pair of clamps to the side of the wheel.

Figure 9 is another detail of a portion of the pickup wheel showing another form of securing the shank of the spike to the wheel.

Figure 10 is a detail showing the clamps used in Figure 8 and showing a portion of the pickup wheel.

Figure 11 is a detail showing the clamps and manner of securing the shank of the spike as shown in Figure 9.

Figure 12 is another modification of the mounting assembly.

The spike 10 illustrated in Figure 1 shows the spike with a round rod-like shank 11. On the outer top end of the spike 10 an outer cone 12 is formed and directly below the cone 12 are a series of cones 13 and 14 which are formed as an integral part of the outer end of the spike.

The conical ends 12, 13, and 14 of the spike 10 provide a series of shoulders 15 at the base of each conical portion. The rod portion of the spike 10 directly below the lower conical end 14 such as the portion 16 is reduced in diameter below the diameter of the shank portion 11 and a washer shoulder 17 is secured to the shank 11 of the spike 10.

The spike 10 may be secured to the pickup wheel 18 illustrated in Figures 8 and 9 as shown by the U shaped clamps 19 in Figure 8 and the clamp 19 is Figure 9.

Where one clamp 19 is used as illustrated in Figure 9, the shank 11 of the spike 10 is bent at right angles to form end 20 which projects into the hole 21 formed in the wheel 18 as shown in Figure 9.

The clamps 19 shown in Figure 8 support the spike 10 adjustable so that the spike may be projected more or less from the outer edge 22 of the wheels 18.

A number of wheels are adapted to be used on a harvester and each of the wheels is formed with plate-like rim 18 with an outer arcuated or circular rim 22 and with internal teeth 23 formed on the inside of the wheel. Only small details of the wheels are illustrated in the drawings, but the beet harvester is not illustrated. In a beet harvester of this character using wheels to pick up the sugar beets out of the ground as they have been plowed loose by suitable plow means (not illustrated), each wheel carries a large number of the pickup spikes 10 projecting from the outer rims 22 of the wheels and spaced comparatively close so that one or more spikes 10 will penetrate into the crown of the beet and pick it up out of the ground as the wheel rotates. The wheels are large like a large wheel on a tractor and rotate over the ground to cause the spikes 10 to penetrate into the crown of the beets.

The shoulders 15 on the spikes 10 keep the beet from falling off the spike as the beet is raised out of the ground.

The washer shoulders 17 prevent the spike from being forced too far into the top of the beet.

In the form of the spike illustrated in Figures 2 and 4 longitudinal grooves 24 are formed extending through the respective cones 12, 13, and 14. The grooves 24 permit the fibers in the beet to enter therein and to cause the shoulders 15 at the base of the cones to creep firmly as barbs to hold the beet firmly on the outer end of the spike 10.

The outer end of the spike 10 may be formed flat as illustrated in Figures 5 and 6 by the end portion 25. In this form the end 25 is like a blade and is formed with shoulders 15' beneath the point 26 and shoulders 15' act as barbs to hold the beet on to the spike. The entire spike 10 may be formed flat if it is desired like the flat end 25. When the spike 10 is formed flat it will enter into the beet like a knife blade making a very small slot-like cut in the crown of the beet.

It may also be desirable to form the rim of the wheel 18 with radial grooves 27 so that the shank 11 of the spike may be held in the grooves 27 to hold the spike in upright position. When grooves 27 are formed in the wheel 18 only a single clamp 19 is necessary to hold the spike 10 to the wheel 18.

The primary features reside in providing the spikes for picking up beets out of the ground when the beets have been plowed loose of the earth. It is desirable that the spikes are adjustable and replaceable which is provided in the combination herein defined. It is also desirable that the spikes be formed with a sharp outer end having a series of barbs or shoulders which may be formed on either side of the spike when it is flat or which extend annularly around the spike on the piercing end of the same. It is also desirable that a sizeable shoulder be formed on the spike like the annular shoulder 17 so as to limit the distance that the spike will penetrate into the crown of the beet. Furthermore it is desirable that the pickup spikes be staggered so that the adjacent spikes are secured one on one side of the rim of the pickup wheel and one on the other side of the rim; thus the spikes are alternately spaced around the rim of the wheel and well adapted to cover a wider transverse area as the wheel rotates.

The drawings illustrate the different forms of the pickup spikes each of which have the same characteristics of providing a means of securely engaging in the crown of the sugar beet with sufficient holding force to elevate the beet into position so it can be topped and the crown of the beet can be pushed off the spikes. One or more spikes will usually enter the crown of the beet to elevate it out of the ground. In this manner the spikes act as tines which penetrate into the crown of the beet, hold it firmly and by means of the rotating wheel 18 the beet is elevated out of the ground into position to be topped.

I claim:

1. A beet pickup spike including a shank for adjustably supporting the spike to a rotatable wheel, the outer portion of said shank reduced in diameter, a series of barbs formed in said reduced diameter portion, a washer shoulder secured at the base of said reduced shank portion to control the amount of penetration of the spike into a beet.

2. The combination of a thin flat wheel and a beet pickup spike having a strong base portion adapted to lie against the face of said flat wheel, clamping bolts extending through the wheel rim to adjustably support said spike, a reduced outer shank formed on said spike, a series of barbs formed on said shank and a washer shoulder fixed on said shank at the base thereof.

GEORGE A. CUSHMAN.

REFERENCES CITED

The following references are of record in the file of this patent:

UNITED STATES PATENTS

| Number | Name | Date |
|---|---|---|
| 166,663 | Van Wagenen | Aug. 10, 1875 |
| 318,566 | Jones | May 26, 1885 |
| 495,505 | Martin | Apr. 18, 1893 |
| 1,533,672 | Stockstill | Apr. 14, 1925 |
| 1,790,387 | Monroe | Jan. 27, 1931 |